M. W. CANFIELD

PROCESS AND APPARATUS FOR INKING EMBOSSED WORK

Sept. 15, 1931. Re. 18,197

Original Filed Dec. 9, 1929

Inventor;
Melville W. Canfield,
per Arthur J. Farnsworth.
Attorney.

Reissued Sept. 15, 1931

Re. 18,197

UNITED STATES PATENT OFFICE

MELVILLE W. CANFIELD, OF LOS ANGELES, CALIFORNIA

PROCESS AND APPARATUS FOR INKING EMBOSSED WORK

Original No. 1,797,323, dated March 24, 1931, Serial No. 412,809, filed December 9, 1929. Application for reissue filed August 5, 1931. Serial No. 555,334.

In this specification, and the accompanying drawings, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to means for inking embossed surfaces; such as raised letters, designs, and borders. Among its principal objects are: first, to provide an improved means for inking such surfaces to secure sharply defined outlines, and to eliminate fringing effects; second, to effect a material saving of ink required for this purpose; third, to make it possible to ink raised borders, etc., that enclose other raised work; fourth, to afford facilities for inking different portions of raised work in different colors, at one operation; and, fifth, to provide simple and practical apparatus for accomplishing the above results.

My objects are attained in the manner shown in the accompanying drawings, in which:—

Similar reference numerals refer to similar parts throughout the several views.

Figure 1:
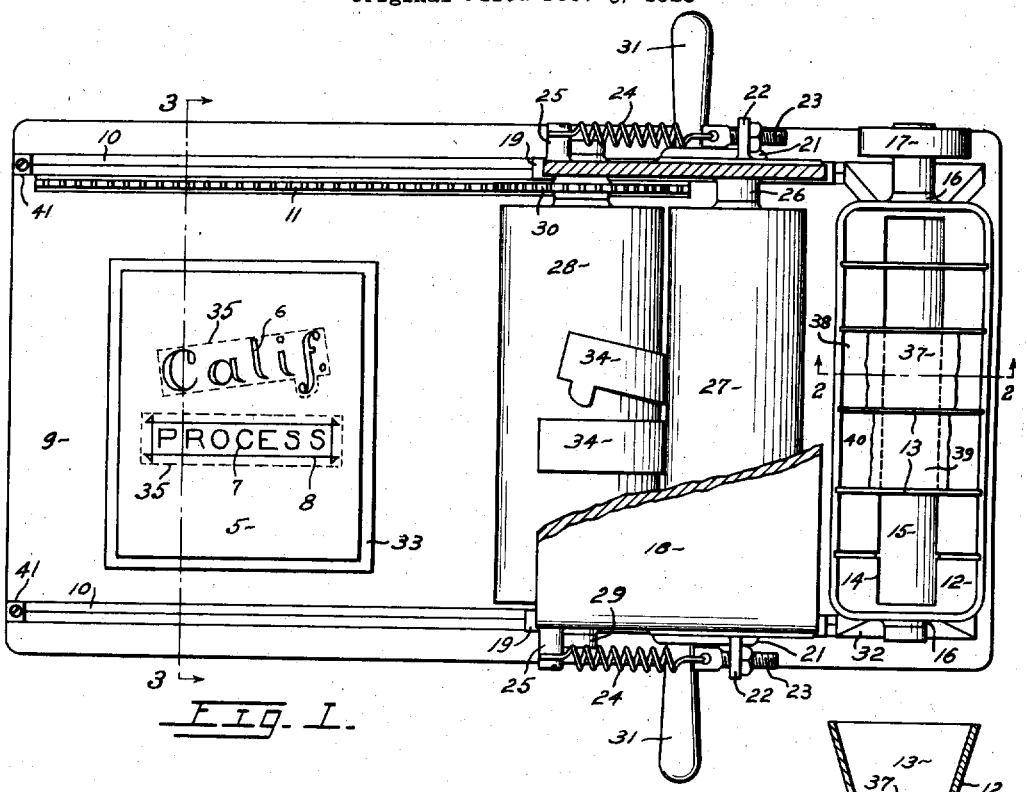
Figure 1 illustrates simple form of hand-apparatus for utilizing my invention, the view being in plan, and having certain parts broken away for convenience in disclosing the underlying structures.

For the purposes of this disclosure, I have selected as an illustration of the application of my improved process, a method of inking certain raised surfaces on a book cover 5. Thus the words "Calif." and "process" comprise embossed letters 6 and 7 respectively. The word "Process" is enclosed within a border 8 which is also embossed. It will be noted that the letters composing the word "Calif." are placed upon the book cover diagonally; and we will assume that they are to be colored yellow, and that the letters composing the word "Process", and the border thereround, are to be colored red.

The simple form of apparatus shown for accomplishing the above purpose comprises a bed-plate 9, having parallel longitudinal V-grooves 10 near the respective edges thereof, and a longitudinal rack 11 at one side. At the right-hand end of the machine is an elevated ink-fountain 12, adapted for being variably divided by removable partitions 13. This fountain has a slot 14 at the bottom, extending from one end to the other, and directly below the slot is a rotatable distributing roller 15. This is mounted in bearings 16 on the frame of the fountain, and is adapted for being driven at a uniform rate of revolution, as by the pulley 17.

A carriage 18, of inverted U-shape, having wedge shaped feet 19 engaging grooves 10, is longitudinally slidable upon the bed-plate. The opposed legs of this carriage are horizontally slotted, as shown at 20, in such a manner as to provide guide-ways for horizontally slidable blocks 21, of which there is one at each side. These blocks are provided with outstanding lugs 22 carrying adjustably positioned eye-bolts 23. Tension springs 24 are stretched between these eye-bolts, and studs 25 on the carriage. By means of these springs, the blocks 21 are normally constrained to remain at the left-hand ends of slots 20.

Between blocks 21, and carried thereby in bearings 26, is a freely rotatable application roller 27. A somewhat larger inking roller 28 is rotatably mounted directly between the legs of the carriage in bearings 29. The shaft of the latter roller carries a spur gear 30, which engages rack 11 and thereby rotates this roller as the carriage is pushed back and forth in the V-grooves of the base.

Operating handles 31 extend outwardly from blocks 21, and by their means carriage 18 may be slid upon the bed-plate from one end to the other. The motion of the carriage to the right is limited by its feet 19 coming in contact with feet 32 of the ink fountain. When this occurs, although the carriage can be pushed no further to the right, the blocks 21 can be moved further in this direction, by slightly stretching the tension springs 24. This allows application roller 27 to contact with distributing roller 15, and to obtain a supply of ink on its surface thereby.

Figure 2:
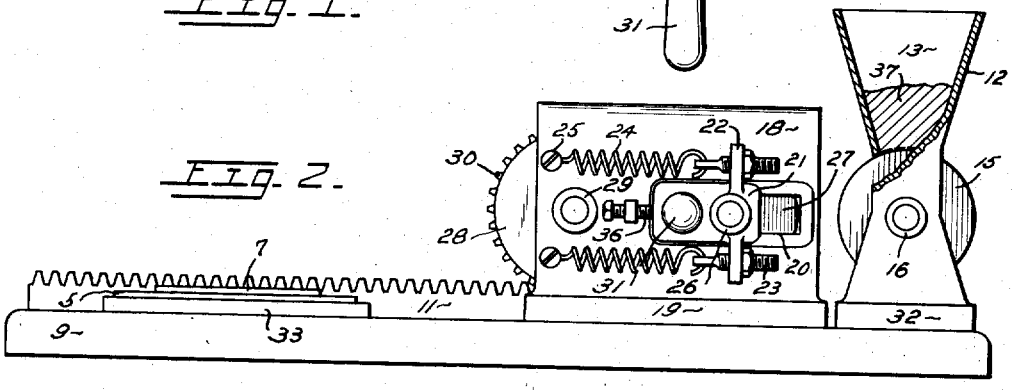
Figure 2 is a side elevation of the above apparatus, with certain parts broken; and, Figure 3 is an end elevation of the apparatus, in section taken on the line 3—3 of Fig. 1.
Figure 3:
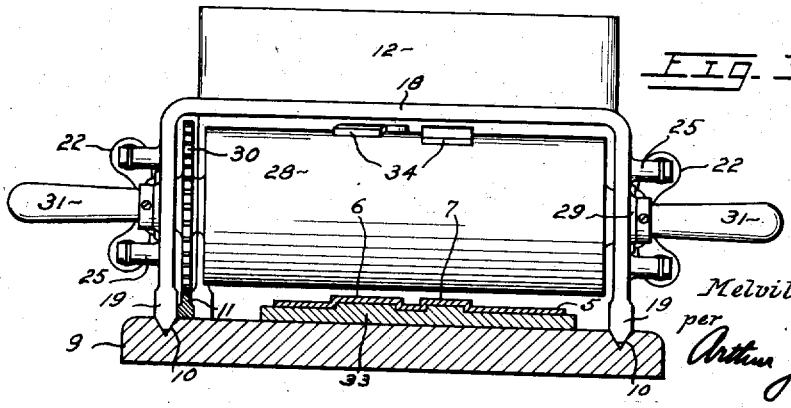

Assuming that the raised work to be inked is embossed on paper or other yieldable material, it is usually best to place it upon an underlying die-plate 33. Inking pads 34, of relatively thick sheet rubber, are cut to shapes indicated by dotted lines 35, to include the raised lettering or other raised work that is to be inked in any one color. These inking pads are then cemented to inking roller 28, in proper positions to register with the work that is to be inked. Adjusting screws 36 (shown only in Fig. 2) are provided at each side of the carriage, to limit the left-hand movement of blocks 21, and thus provide any desired pressure of contact between application roller 27 and the inking pads 34.

Assuming that yellow printing ink 37 is deposited in section 38 of the ink fountain, and that red ink 39 is deposited in section 40 of the same, and that distributing roller 15 is being rotated by power applied through pulley 17, the operation is as follows:—

The operator grasps handles 31 and pushes them toward the right so as to move application roller 27 against distributing roller 15. The application roller will thus have imparted to it circumferential bands of yellow and red ink. As soon as the right-hand pressure upon the handles is released, springs 24 will retract the application roller to the left, and cause it to contact with inking pads 34. The carriage is then moved to the left by means of the handles, and the engagement between spur-gear 30 and rack 11 will cause inking roller 28 to revolve. The inks on the application roller will thus be spread upon the inking pads 34, and the latter will deposit the ink in its respective colors upon the embossed work to be inked, as soon as the carriage is moved sufficiently far towards the left. Stops 41 prevent the carriage from over-travelling. The carriage is then moved again toward the right to repeat the process, and the raised work is again inked in so doing. The work thus treated is removed and replaced while the carriage is in its right-hand position.

From the foregoing description it will be apparent that embossed work of a great variety of design may be inked by my improved process, in a number of colors at one operation. It will also be seen that no stencils are required in the process. Still further it will appear that enclosing continuous borders may be used, which is not possible when stencils are employed. The inking pads 34 may be made of any desired thickness, which is a very great advantage when the body of the work to be inked is rough, wrinkled, or buckled. Finally it will appear that there will be a material saving of ink by reason of the fact that the ink is applied only to inking pads 34, and not to the entire surface of the inking roller.

Although, for the sake of simplicity, I have shown and described a very simple form of hand-apparatus for making use of my improved process, it will be apparent that the work may be accomplished by automatic machinery adapted to function in the same manner. Such machinery can readily be produced by competent designers, in the light of this disclosure.

Having thus full disclosed my invention, I claim:—

1. The herein described process, comprising; making a pad of a size and shape that is adapted to cover a raised surface to be inked; attaching the pad to the periphery of a roller; inking the face of the thus attached pad; and causing relative lateral movement between the roller and surface with concurrent rotation of the roller, in such manner that the inked pad will come into rolling contact with said surface as a result of said relative movement.

2. The herein described process, comprising; making a pad of a size and shape that is adapted to cover with small margin a raised surface to be inked; attaching the pad to the periphery of a roller; inking the face of the thus attached pad; and causing relative lateral movement between the roller and surface with concurrent rotation of the roller, in such manner that the inked pad will come into rolling contact with said surface as a result of said relative movement; said pad being so positioned upon the roller as to register with said surface as it contacts therewith.

3. The herein described process, comprising; making a pad of a size and shape that is adapted to cover with small margin a raised surface to be inked; attaching the pad to the periphery of a roller; inking the face of the thus attached pad; and causing relative lateral movement between the roller and surface with concurrent rotation of the roller, in such manner that the inked pad will come into rolling contact with said surface as a result of said relative movement; said pad being so positioned upon the roller as to register with said surface as it contacts therewith; and said roller being constrained to rotate so as to prevent slipping between said pad and surface when they are in contact.

4. The herein described process, comprising; making a pad of a size and shape adapted to cover with small margin a raised surface to be inked; attaching the pad to the periphery of a roller; uniformly inking the face of the thus attached pad; and moving the roller laterally and rotatively over said surface in such manner that the pad will come into rolling contact with the entire area thereof.

5. The herein described process, comprising; making a pad of a size and shape adapted to cover with small margin the boundaries of a raised surface to be inked; attaching the pad to the periphery of a roller; uniformly inking the face of the thus attached pad; and moving the roller laterally and rotatively over said surface at a distance therefrom; said pad being of a thickness adapting it to come into rolling contact with said surface when the roller is thus moved, and being so positioned upon the roller as to register with said surface as it rolls thereover.

6. The herein described process, comprising; making a pad of uniform thickness of a size and shape adapted to cover with small margin the boundaries of a raised surface to be inked; attaching the pad to the periphery of a roller; uniformly inking the face of the thus attached pad; and moving the roller laterally and rotatively over said surface at a uniform distance therefrom; said roller being constrained to rotate proportionally to its lateral movement and so as to prevent slipping between said pad and surface when they are in contact; and said pad being of a thickness adapting it to contact with said surface when the roller is thus moved, and being so positioned upon the roller as to register with said surface as it rolls thereover.

7. Apparatus of the character described, comprising; means for supporting work having a raised surface to be inked; a rotatable roller adapted for relative lateral movement with respect to said surface at a distance therefrom; a raised pad upon the periphery of the roller adapted to come into rolling contact with said surface as a result of said relative movement; and means for inking the face of the pad; the dimensions and shape of the pad, and its position upon the roller, adapting it to register with said surface as it contacts therewith.

8. Apparatus of the character described, comprising; means including a bed for supporting work having a raised surface to be inked; a carriage adapted for relative lateral movement with respect to said bed; a roller rotatably mounted upon the carriage at a distance from the bed; a raised pad upon the periphery of the roller adapted to come into rolling contact with said surface as a result of said relative movement; and means for inking the face of the pad; the dimensions and shape of the pad, and its position upon the roller, adapting it to register with said surface as it contacts therewith.

9. The construction set forth in claim 7, in combination with means for constraining the roller to rotate proportionally to its relative lateral movement, and so as to prevent slipping between said raised surface and pad when they are in contact.

10. The construction set forth in claim 8, in combination with; means for constraining the roller to rotate proportionally to said relative lateral movement, and so as to prevent slipping between said raised surface and pad when they are in contact; and wherein the inking means includes an application roller adapted for lateral movement upon the carriage, away from the pad, to contact with an ink supply.

11. Apparatus of the character described, comprising; means for supporting work having a raised surface to be inked; a rotatable roller adapted for being laterally moved over said surface at a distance therefrom; a raised pad upon the periphery of the roller adapted to contact with said surface and to roll thereover; and means for uniformly inking the face of said pad; the dimensions and shape of the pad and its position upon the roller, being such as to bring it into registering contact with the raised surface as it rolls thereover.

12. Apparatus of the character described, comprising; a bed adapted for supporting work having a raised surface to be inked; a carriage upon the bed adapted for being laterally moved over said surface; a roller rotatably mounted upon the carriage at a distance from said bed; a raised pad upon the periphery of the roller adapted to contact with said surface and to roll thereover; and means for inking the face of said pad; the dimensions and shape of the pad and its position upon the roller, being such as to bring it into registering contact with the raised surface as it rolls thereover, with small margin over said surface.

13. The construction set forth in claim 11 in combination with means for constraining the roller to rotate proportionally to its lateral displacement, and so as to prevent slipping between said raised surface and pad when they are in contact.

14. The construction set forth in claim 12 in combination with; means for constraining the roller to rotate proportionally to the lateral displacement of the carriage, and so as to prevent slipping between the raised surface and pad when they are in contact; and wherein the means for inking the pad comprises an application roller adapted for lateral movement upon the carriage, away from the pad, to contact with an ink supply.

MELVILLE W. CANFIELD.